United States Patent
Bertil et al.

(10) Patent No.: US 10,506,368 B1
(45) Date of Patent: Dec. 10, 2019

(54) METHOD AND A SYSTEM FOR MATCHING SUBSCRIPTIONS WITH PUBLICATIONS

(71) Applicant: Université de Lausanne, Lausanne (CH)

(72) Inventors: Chapuis Bertil, Lausanne (CH); Garbinato Benoît, Lausanne (CH)

(73) Assignee: Université de Lausanne, Lausanne (CH)

( * ) Notice: Subject to any disclaimer, the term of this patent is extended or adjusted under 35 U.S.C. 154(b) by 0 days.

(21) Appl. No.: 16/034,954

(22) Filed: Jul. 13, 2018

(51) Int. Cl.
*H04W 24/00* (2009.01)
*H04W 4/021* (2018.01)
*H04L 29/08* (2006.01)
*H04W 4/18* (2009.01)
*H04W 88/02* (2009.01)
*H04M 1/725* (2006.01)

(52) U.S. Cl.
CPC ............ *H04W 4/021* (2013.01); *H04L 67/18* (2013.01); *H04L 67/26* (2013.01); *H04L 67/327* (2013.01); *H04W 4/185* (2013.01); *H04M 1/72519* (2013.01); *H04M 1/72522* (2013.01); *H04W 88/02* (2013.01)

(58) Field of Classification Search
CPC ..... H04W 4/021; H04W 4/185; H04W 8/245; H04W 88/02; H04L 67/18; H04L 67/26; H04L 67/327; H04M 1/72519; H04M 1/72522
USPC .................... 455/456.3, 418, 550.1; 709/206
See application file for complete search history.

(56) References Cited

U.S. PATENT DOCUMENTS

| 9,218,220 | B2* | 12/2015 | Chen | G06F 9/5083 |
|---|---|---|---|---|
| 9,250,975 | B2* | 2/2016 | Chen | G06F 9/5083 |
| 2004/0181588 | A1* | 9/2004 | Wang | H04L 29/06 709/207 |
| 2011/0258268 | A1* | 10/2011 | Banks | G06Q 10/06 709/206 |
| 2014/0019443 | A1* | 1/2014 | Golshan | G06F 16/9535 707/723 |

(Continued)

Primary Examiner — Danh C Le
(74) Attorney, Agent, or Firm — Blank Rome LLP (57) ABSTRACT

A method for matching subscriptions of subscribing client nodes (5) with publications of publishing client nodes (4),
wherein each subscription is associated with a territory of the subscription (2B) and wherein each publication is associated with a territory of the publication (2A);
wherein a geographical region (7) is divided into a plurality of tiles (1);
wherein each tile (1) has an associated matching node (3) for detecting matches between publications and subscriptions in that tile;
wherein a match is detected when the territory associated with a given subscription and the territory associated with a given publication overlap in that tile (1);
wherein the matching node is arranged to trigger an action such as for example notifying the subscribing client node when such a match has been detected;
wherein each matching node (3) is further arranged to detect when a match between a particular publication and a particular subscription will be detected in more than one tile (1);
and wherein said matching node (3) uses an a priori agreement for determining whether it triggers said action or whether another matching node (3) will do it when a match between a particular publication and a particular subscription will also be detected by the other matching node.

17 Claims, 3 Drawing Sheets

(56) References Cited

U.S. PATENT DOCUMENTS

| | | | |
|---|---|---|---|
| 2016/0021043 A1* | 1/2016 | Modi | H04L 49/1584 |
| | | | 709/206 |
| 2016/0147860 A1* | 5/2016 | Sample | G06F 16/275 |
| | | | 707/625 |
| 2016/0256143 A1* | 9/2016 | Manasse | A61F 2/2436 |
| 2017/0256015 A1* | 9/2017 | Moecklin | G01S 19/46 |

* cited by examiner

METHOD AND A SYSTEM FOR MATCHING SUBSCRIPTIONS WITH PUBLICATIONS

FIELD OF THE INVENTION

The present invention concerns a highly scalable method and system for matching location-dependent subscriptions with location-dependent publications.

DESCRIPTION OF RELATED ART

Moving objects and moving users produce increasing amounts of geo-located data. For example, it is now common for cellular network operators and data analytic companies to collect up to several millions of geographical data points per seconds. More and more moving objects are connected to the Internet and, with initiatives such as the LoRa Alliance, even insignificant objects may soon become communicative.

In this context, when it comes to developing context-aware applications that want to take advantage of the Internet of things (IoT) ecosystem, location-based publish and subscribe services are of particular interest. Those services require subscribers or objects to be instantly notified when a publication enters the range of his subscription, usually in the form of a push notification, or by triggering another action. A match occurs between a given publication and a given subscription if a context criterion (such as a proximity or overlap between the territories associated with the subscription and with the publication) and a content criterion (for example a semantic relationship) are both met simultaneously.

To achieve this, most existing solutions rely on classic indexing data structures, such as R-trees, in order to compute matches between publications and subscriptions, in particular when the publisher or the subscriber continuously update their location and thus the associated territories. This approach is widely used but raises scalability issues.

In order to address these needs for scalability, vertically scalable schemes have been used, in which the processing power and memory storage of a central computing unit, such as a server, is gradually expanded by adding additional processing cores, memories and storage bays. The computing unit is responsible for the full workload. This results in a not enough redundant system where any failure or maintenance task of the central server might result in an interruption of the service. Moreover, the exponential growth of the IoT ecosystem can easily exceed the load that is sustainable for a vertically scalable computing unit.

Another approach uses a distributed architecture, for example a load balancing scheme, in which the scalability is achieved by adding new nodes. This approach is more fault-tolerant and often used for example in peer-to-peer networks.

BRIEF SUMMARY OF THE INVENTION

There is therefore a need for a novel method and system for location-aware publish and subscribe that is horizontally scalable.

According to the invention, these aims are achieved by means of a method for matching subscriptions of subscribing client nodes with publications of publishing client nodes, wherein each subscription is associated with a territory of the subscription and wherein each publication is associated with a territory of the publication;

wherein a geographical region is divided into a plurality of tiles;

wherein each tile has an associated matching node for detecting matches between publications and subscriptions in that tile;

wherein a match is detected when the territory associated with a given subscription and the territory associated with a given publication overlaps in that tile;

wherein the matching node is arranged to trigger an action such as for example notifying the subscribing client node when such a match has been detected;

wherein each matching node is further arranged to detect when a match between a particular publication and a particular subscription will be detected in more than one tile;

and wherein said matching node uses an a priori agreement for determining whether it triggers the said action or whether another matching node will do it when a match between a particular publication and a particular subscription will also be detected by the other matching node.

The use of a plurality of matching nodes provides horizontal scalability; additional matching nodes can be added at any time when the performances of the system decrease. Therefore, the system may be expanded to handle a very large number of publications or subscriptions.

An a priori agreement is an agreement that is known in advance by the matching nodes. In a preferred embodiment, each matching node can execute the agreement without any need for sending or receiving messages to other matching nodes. Therefore, each matching node can decide if it must trigger the action (for example sending a message), or if another matching node will do it. This reduces or avoids the number of messages exchanged directly between matching nodes.

The use of an a priori convention avoids the risk that a match is detected by more than one matching node, and that a single message is sent several times, or a single action is triggered several times.

The association between each tile and the matching node responsible for detecting matches within that tile is determined with consistent hashing of the tile identifiers.

In another embodiment, the association between each tile and the matching node responsible for detecting matches within that tile is determined with rendezvous hashing (HRW) of the tile identifiers.

The use of a consistent or rendezvous hashing function insures an even repartition of the computing load for computing the matches between the different matching nodes.

The agreement may depend on a unique identifier of the tile or of the matching node associated with the tile.

The agreement may depend on a hash of said unique identifier of the tile or of the matching node.

The tile or matching node having the lowest said hash among all the tiles respectively matching nodes that detect said match triggers, said event may be selected for sending a message that a match has been detected, or for triggering another action.

A state manager module may determine which tile overlaps with the territory of a new or updated publication or subscription and sends a message to the matching node associated with those tiles.

The state manager module may use consistent hashing functions for determining which among a plurality of tile manager modules will handle said requests.

The state manager module may use rendezvous hashing functions for determining which among a plurality of tile manager modules will handle said requests.

In another embodiment, this task of determining the overlaps between territories of publications and subscriptions is delegated to a central front-end module.

In another embodiment, this task of determining the overlaps between territories of publications and subscriptions is delegated to a plurality of front-end modules. In this embodiment, the location history of each subscriber or publisher is stored by the tile manager module, so the state manager module may be unnecessary.

A front-end module may receive requests from said client nodes to add, update or remove publications or subscriptions.

A plurality of distributed front-end modules may be used.

The front-end module may forward said requests to a state manager module.

The front-end module may use consistent hashing functions for determining which among a plurality of state manager modules will handle said requests.

The front-end module may use rendezvous hashing functions for determining which among a plurality of state manager modules will handle said requests.

The client nodes may be IoT enabled devices, i.e. objects comprising an Internet connectivity and that can send messages over the Internet autonomously.

The invention is also related to a matching node arranged for matching subscriptions of subscribing client nodes with publications of publishing client nodes, wherein a match is detected when the territory associated with a given subscription and the territory associated with a given publication overlap;

wherein the matching node is arranged for detecting when a match between a particular publication and a particular subscription will be detected by another matching node and wherein said matching node uses an a priori agreement for determining whether it triggers said action or whether another matching node will do it when a match between a particular publication and a particular subscription will also be detected by the other matching node.

According to an aspect, the invention further relates to a system comprising a plurality of client nodes arranged for sending geo-localised publications and/or geo-localised subscriptions;

a plurality of matching nodes arranged for detecting matches between subscriptions and publications, wherein each of said matching nodes is arranged for detecting matches in a limited number of tiles among a larger number of tiles;

wherein each matching node is further arranged for detecting when a match between a particular publication and a particular subscription will be detected by more than one matching node;

and wherein said matching node uses an a priori agreement for determining whether it triggers said action or whether another matching node (3) will do it when a match between a particular publication and a particular subscription will also be detected by the other matching node.

The solution thus uses consistent hashing in conjunction with range partitioning expressed with the notion of tiles in order to evenly distribute the computation of matches across a cluster.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
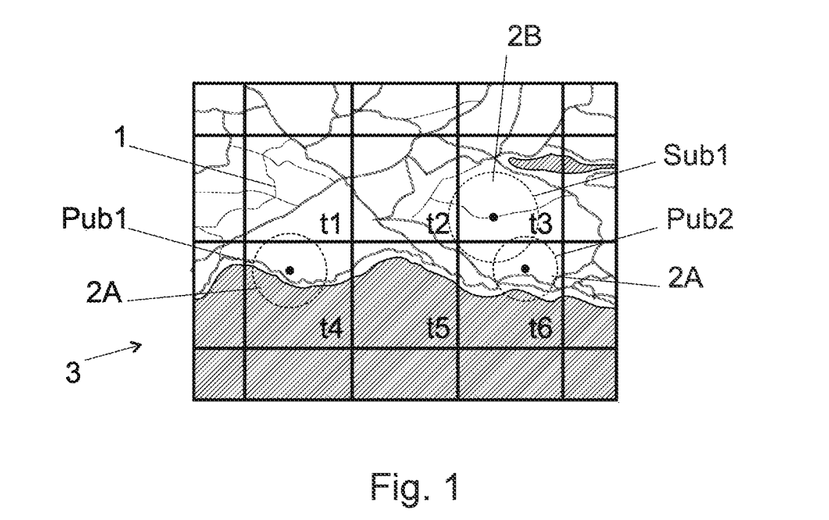
FIG. 1 schematically depicts a grid layout as well as location-based subscriptions and publications.

FIG. 1 illustrates a grid layout that divides the whole world or a region 7 of the world, or of any real or virtual world, into a set of tiles 1. The layout of the grid is preferably static or semi-static, i.e., it is predefined and does not change, or only occasionally.

The size of the different tiles 1 might be identical. Alternatively, smaller tiles might be used in dense areas where more publications and subscriptions occur than in areas with sparser traffic.

The tiles 1 might be rectangular, hexagonal, or have any shape suitable to cover a region. Rectangle-based grids rely on a map projection, which is necessary for mapping coordinates on a sphere to coordinates on a plane. Some tiles might cover several square kilometres, a few square metres, or a few square centimetres. 3D tiles might also be considered, for example in order to distinguish between the different floors of a building. In a virtual word, for example in a video game such as a massively parallel multiplayer game, the dimensions of the tiles might be virtual.

The tiles 1 are used in the system of the invention for partitioning the region 7, so that each tile handles publications and subscriptions that overlap this tile, detects matches in the tile, and sends messages or triggers another action when a match has been detected. As will be described, the set of tiles responsible for handling a particular publication or subscription will be updated continuously as publications and the subscriptions are continuously created and moved from tile to tile.

FIG. 1 also shows two publications Pub1 and Pub2 and one subscription Sub1, with the associated territories 2A respectively 2B.

A publication is for example a piece of information, such as a news item, an advertisement, a local-based service, an access right, a localized information or an event that has some relevance in a given territory 2A and during a given period of time. A publication might include a content, such as a piece of information, and optionally one or a plurality of selection criteria, such as a type, an author, a subject, etc., for filtering publications. A publication further indicates a context, including a territory in which the publication is made available and possibly a period during which this publication is accessible.

Formally, a publication pub is defined as tuple pub (id;Z;A), where id uniquely identifies the publication pub, Z denotes the territory where the publication pub is active and the set A=(a1;a2, . . . , aj) denotes a collection of attributes of the form a=(name; value). In other words, A defines the content of the publication pub, whereas Z defines its context.

This tuple might be stored as a record in a computer database, in a file, or transmitted in an electronic message for example.

A subscription is an explicit or implicit request to receive or be able to retrieve the publications made available in a given territory indicated in the subscription, during a given period of time. As publications, subscription might also include one content and one context.

Formally, a subscription sub is defined as tuple sub=(id; Z;A; issuer), where issuer uniquely identifies the client node that issued the subscription sub. This tuple might also be stored as a record in a computer database, in a file, or transmitted in an electronic message for example.

A territory 2 is a geographic area, or a virtual geographic area, for which publications are made available or for which subscribers have subscribed for some publications. One distinguishes between territories of a publication 2A, and territories of a publication 2B. A territory might correspond to a continent, country, region, department, city, district, street, perimeter, any other suitable geographic delimitation, or the surface delimited by a given radius around a location. The boundaries of a territory do not necessarily match the limits between tiles; for example, on FIG. 1 none of the territories 2A, 2B could be precisely defined by the limits between the tiles 10.

Publications and subscriptions are issued by client nodes. A client node can be a physical device, for example a user personal device such as a personal computer, a smartphone, a wearable, any object with connexion capabilities, an ioT device, or a virtual object or element in a virtual world. A client node can execute a software in order to communicate within the system.

Figure 2:
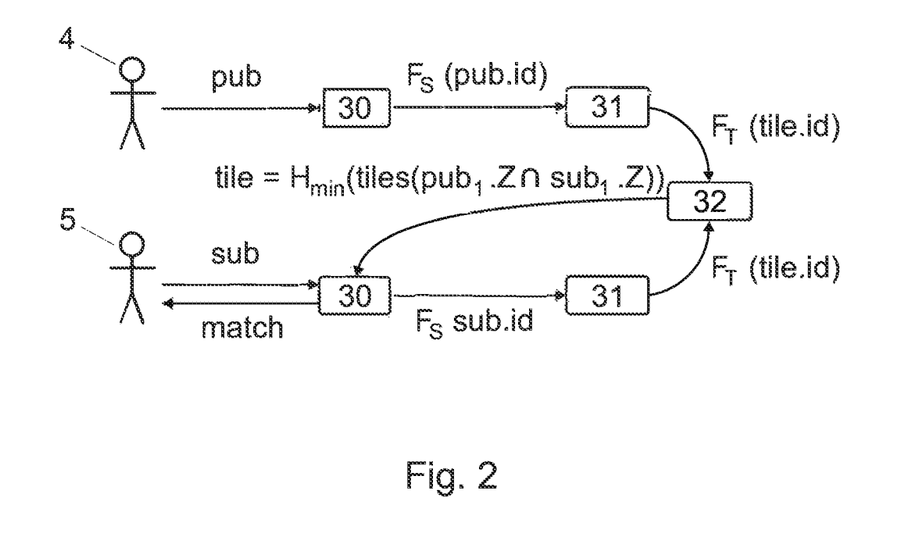
FIG. 2 is a flow diagram that shows how publications are matched with corresponding subscriptions.

As shown with FIG. 2, A client node might act as publisher 4 and/or as subscriber 5, and thus issue territorially scoped publications and subscriptions. Those publications and subscriptions might depend on the geographic location of the client node; in that case, if the client node moves, the territories associated with its publications and subscriptions are also moving.

Other publications and subscriptions can be independent from the location of any client node. For example, an advertiser might send a publication, such as an advertisement, that will be presented to subscribers having subscribed for publications in a territory remote from the location of the advertiser.

A publication associated with a territory that changes when the publishing client node moves, or for any other reason, will be called a moving publication. Similarly, a subscription associated with a territory that changes when the subscribing client node moves, or for any other reason, will be called a moving subscription.

Given a moving subscription sub and a moving publication pub, a match occurs when the following two conditions are met:

sub.Z∩pub.Z≠0
and
sub:A⊆pub:A

The first condition captures the fact that the geographical territories associated with pub and with sub overlap; this is known as a context match or a location match. FIG. 1 depicts two publications pub1 and pub2 and a subscription sub1 that only matches with pub2 in terms of location.

The second condition captures the fact that the content of the publication pub corresponds, entirely or partially, to the content of the subscription sub; this is known as a content match. Other matching criteria, including partial matches, proximity content matches, or semantic matches, might be used.

When such a match occurs, the client node that issued the subscription sub is notified by asynchronously receiving a tuple (pub;sub), or any equivalent information. The detection of a match might also trigger a different action, for example an action that does not involve a message to the subscriber. For example, a subscriber may want to switch on a lamp automatically every time any user (as publisher) of smartphones as client nodes enters the territory associated with the lamp.

Figure 5:
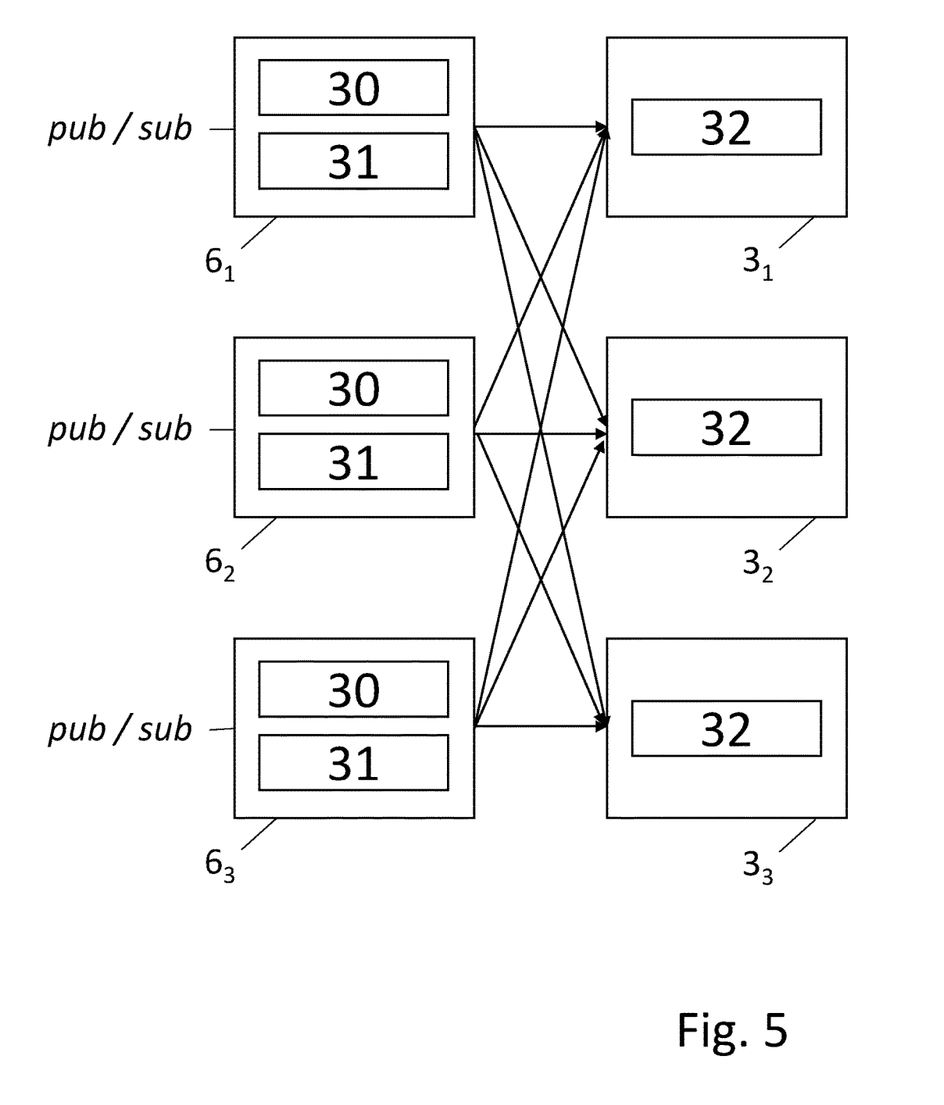
FIG. 5 shows some modules or nodes of a system according to an aspect of the invention.

As shown with FIG. 5, the task of matching subscriptions with publications is performed in a decentralized way by distributed computing units called matching nodes $3_1, 3_2, 3_3$. A matching node 3 comprises one or a plurality of software modules, in the illustrated example tile manager modules $3_2$, that can be executed for example, without restriction, by a physical server, a personal computer, a smartphone, any object with some processing capabilities, or a virtual server or processing unit.

Other distributed computing units as access nodes 6 are used for receiving each publication or subscription request, for determining which tiles overlap with the corresponding territories 2A, 2B, and for allocating the task of computing the matches to one of the matching nodes 3. The allocation is based on a family of hash functions called consistent hashing.

The number of matching nodes 3 does not necessarily correspond to the number of tiles 1 and one single matching node 3 might be responsible for several tiles. Depending on the number of matching nodes 3 and tiles 1, each matching node might be responsible for computing matches within one tile, or within a plurality of tiles but not with all the tiles.

The association between tiles and matching nodes 3 is preferably static; it only changes when new matching nodes are added, when existing matching nodes are removed or unavailable, or when the partitioning into tiles changes.

Consistent hashing functions are executed once during the initialization of the system, and each time a node 3 is added or removed. When the system is running, consistent hashing is used for associating each tile with one matching node, and for evenly distributing the load of matching computations on the cluster of matching nodes 3. This method ensures a repartition of the computing load for computing all the matches between all the available matching nodes.

Figure 3:
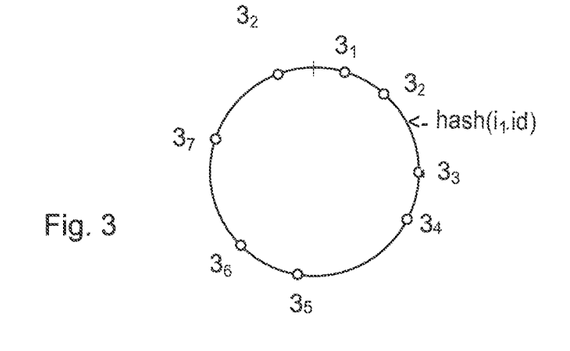
FIG. 3 shows a representation of the consistent hashing of matching nodes on a ring.

As illustrated in FIG. 3, consistent hashing might be represented as a ring in which the largest possible hash value convolutes to the smallest possible hash value. Each matching node 3 is assigned a fixed position on the ring, for example by hashing a unique identifier of that matching node.

In one embodiment, the minimum possible hash value, zero, would correspond to an angle of zero, the maximum possible value (depending on the number of bits of the hash) would correspond to an angle of 360 degrees, and all other hash values would linearly fit somewhere in between. Therefore, the hash of the identifier of each matching node 3 defines where it lies on the circle's edge. In the example of FIG. 3, hashing the identifier $i_1$.id of publication item $i_1$ gives a placement value between $3_2$ and $3_3$, therefore the matching node $3_3$ is responsible for item $i_1$.

In order to find the matching node responsible for handling matches within a given tile, a unique identifier of that tile is hashed, then the next first matching node 3 on the ring with a hash greater than the resulting hash value is selected. Here, consistent hashing is of particular interest as it ensures that when matching nodes 3 are added or deleted, the distribution of tiles 1 across existing matching nodes does not change.

In the example of FIG. 3, hashing the identifier $i_1$.id of the tile item $i_1$ gives a placement value between $3_2$ and $3_3$, therefore the matching node $3_3$ is responsible for tile $i_1$.

Alternatively, it would also be possible to select for each tile the matching node 3 having the closest lower hash value to the tile 1.

In other words, the unique identifier of a tile 1 is passed to a consistent hashing function and the resulting hash value is then used to find the matching node 3 responsible for finding matches involving that tile.

When a client node wants to issue a new publication, or when it moves and hence needs to update the geographical territory associated with its existing publications, it sends messages to the cluster of access nodes 6 and matching units 3. The latter is responsible for computing the matches and for sending messages to the client nodes that issued the subscriptions concerned by those matches. Client nodes thus do not communicate directly with each other.

The system comprises at least the following modules: a front-end module 30, a state manager module 31 and a tile manager module 32. The front-end module and the state manager module may be merged, for example with one access node 6 responsible for the two functions, or with one module responsible for the two functions in each tile.

In the embodiment of FIG. 5, the front-end modules 30 and the state manager modules 31 are distributed within the access nodes 6; each access node includes one front-end modules 30 and one state manager module 31. The tile manager modules 32 are executed in different, separate computing units 3.

This distribution of the functions performed by the various modules is only given as an illustrative example, and other distributions are possible. It would for example be possible to have a different computing unit responsible for the front end module 30 and for each state manager module 31.

The front-end modules 30 are responsible for receiving and routing publication and subscription requests from the client nodes 4,5. For this purpose, the front-end module 30 might present for example a web page, an app for smartphones, or an API that can be used by any publishing or subscribing device or entity for publishing a publication or requesting a subscription.

A client node is not assumed to know which matching node 3 of the cluster is responsible for managing the state of a particular publication or subscription. Therefore, a front-end module 30 might run on every access node of the cluster and be placed behind a load balancer, so the publishing or subscribing client node does not know which node is contacted.

The front-end module 30 routes the requests emitted by the client nodes (for example requests to add a publication, delete a publication, add a subscription, delete a subscription, change the context or the content of a publication, change the context or the content of a subscription, etc.) to a state manager module 31. If the state manager modules 31 executes several processes (for example in a distributed system with a plurality of servers), the routing to one of those processes might depend on a consistent hashing function Fs of the identifier pub.id of the publication, respectively of the subscription sub.id.

The state manager module 31 are responsible for tracking and managing the state of publications and subscriptions in the cluster of matching nodes 3. In particular, it determines which tiles 1 overlap with the territory associated with each subscription and publication, and sends messages to the tile manager module 32 in the matching nodes 3 responsible for those tiles.

When a user registers a new publication or a new subscription, all the tile manager modules 32 in matching nodes responsible for tiles that overlap the corresponding geographical territory are notified by the state manager module. In a similar way, when a user updates the geographical territory associated with a publication or a subscription, some previously notified tile manager modules 32 must be left and new ones be notified.

The state manager modules 31 thus determine which tile 1 overlaps with the territory 2 associated with each new, updated or deleted publication, and each new, updated or deleted subscription. The modules 31 then use a consistent hashing function Ft on the tile identifier to determine the matching node 3 associated with this tile, and sends messages to add, remove or update a publication or a subscription in this matching node 3.

Those matching nodes 3 run the tile manager modules 32 that will eventually compute the matches between subscriptions and notifications.

In order to make sure that these actions are transparent to the client node, the state manager modules 31 record the state of publications and subscriptions and sends the necessary maintenance messages across the cluster of matching nodes 3. When a state manager module receives a message regarding a publication or a subscription, it determines which tiles overlap with the associated territory, and uses consistent hashing on tile identifiers in order to determine the matching nodes 3 responsible for computing possible matches involving this publication or subscription. The tile manager module 32 is a module executed in the matching node 3 that will eventually compute the match and send a notification to the subscriber.

The state manager module 31 also stores a set of all the publications and a set of all the subscriptions, including the states of those publications and subscriptions. As these sets only contain the latest publication and subscription states, the identifiers of each publication pub.id and of each subscription sub.id are used to identify and eliminate older versions from the sets.

FIG. 2 gives an overview of how the aforementioned modules 30-32 all play together. The publisher 4 and the subscriber 5 are different roles of one or different client nodes.

Publisher 4 sends a request for publication pub to one front-end module 30. Front-end module 30 computes the hash Fs of the identifier of the publication pub.id, and sends this publication request to one state manager module 31 selected among a plurality of state manager modules, whereas the selection depends on this hash.

The selected state manager module 31 determines all the tiles 1 that overlap with the territory 2A indicated in the publication, and computes the hash Ft of the identifier of this tile tile.id. It then sends the publication request to the tile manager module 32 in the matching module 3 with the next hash value.

A subscription request sub sent by a subscriber 5 follows a similar path from a front-end 30 and over a state manager module 31 depending on the hash value Fs of the subscription identifier sub.id. This state manager module 31 determines all the tiles 1 that overlap with the territory 2B indicated in the subscription sub, and computes the hash Ft of the identifier of this tile tile.id. It then sends the subscription request to the tile manager module 32 in the matching module 3 with the next hash value.

The tile manager module 32 computes the content and context matches between all the publications and subscriptions received from one or from different state manager modules. If a match is found, it sends a message to the frontend module 30 responsible for the subscription. This front-end module 30 then sends a match message to the subscriber 5, or triggers another action.

As it will be described later, several tile manager modules 32 may detect a same match. An a priori agreement between tile manager modules 32 is used for determining which among those tile manager modules 32 will send the message to the frontend module 30. In the example, the tile manager module 32 with the minimum hash value of the corresponding tile is responsible for this transmission.

Figure 4A:
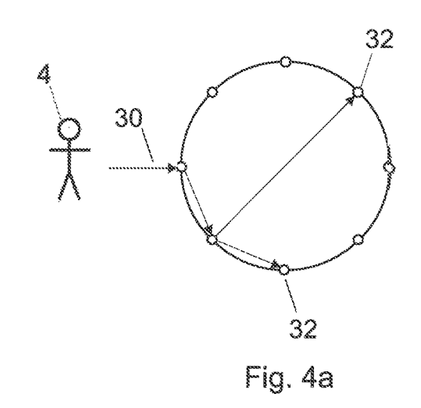
FIG. 4a shows the routing of a publication using consistent hashing.
Figure 4B:
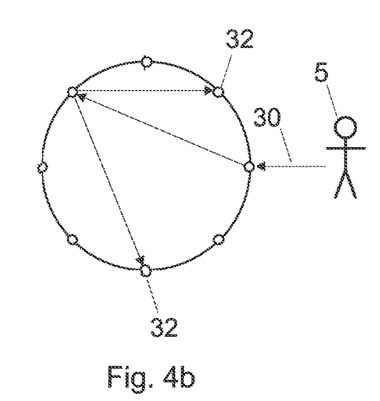
FIG. 4b shows the routing of a subscription using consistent hashing.
Figure 4C:
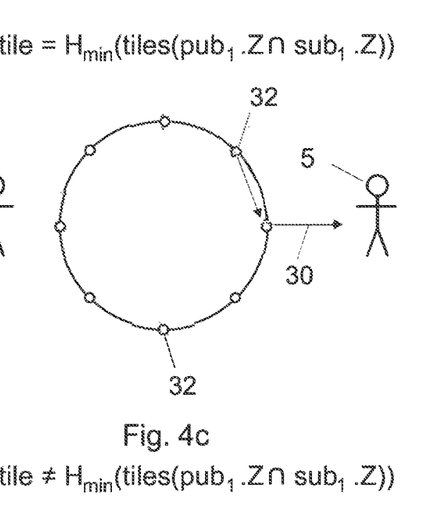
FIG. 4c shows a match between a publication and a subscription using consistent hashing.

FIGS. 4a to 4c show how the allocation of a computing task for finding a match between a given subscription and a publication is made.

The routing of publications from a moving client node to the tile manager module 32 responsible for a tile 1 is illustrated in FIG. 4a. When adding, deleting or updating a publication or when updating its location, the client node of the publisher 4 first contacts the front-end module 30. The publication is then routed from the front-end module 30 to the state manager module 31, which identifies the tiles that overlap the geographical territory of a publication, and notifies the tile manager module 32 of the matching node 3 associated with that tile, i.e., the matching node 3 with the closest next identifier hash value.

When the location of a publication or subscription is updated, it might enter some tiles 1 and leave some others. Therefore, it is necessary to have a process responsible for tracking the state of a publication in the cluster of matching nodes 3 and notifying the tile manager modules 32 in a consistent manner. To this end, intermediary, the state manager modules 31 determine which tile manager module 32 will handle each subscription and each publication. One state manager module 31 might be present or associated with each access node 3, and for example merged with the frontend manager 30.

As illustrated in FIG. 4b, the routing of subscriptions sent by a subscriber 5 is symmetrical to the routing of publications and achieves the same purpose. The addition or update of a subscription first goes through the front-end module 30. It is then routed to the state manager module 31 and finally to the tile manager module 32 of the matching node 3 that handles the tile responsible for the subscription, using consistent hashing on the tile identifier for the allocation The tile manager module 32 in each matching node 3 is responsible for triggering matches when a publication and subscription overlap in a tile. FIG. 4c illustrates the routing of a publication that matches a subscription back to the subscriber. The tile manager module 32 in each matching node 3 that handles the tiles in which an overlap between the territory of a publication and the territory 2B of a subscription overlap detects this match. If several tile manager modules 32 detect the same match, only one of the sends a message to the front-end module 32 that eventually notifies the subscriber 5, or triggers any other action. In the example, the tile manager module 32 of the tile having the tile identifier with the minimal hash value is selected for this notification; other a priori agreements between tile manager modules can be used.

In the example of FIG. 1, the territory 2B associated with the subscription sub1 overlaps with the tiles t2, t3, t5 and t6; the territory 2A associated with the publication pub2 overlaps with the tiles t3 and t6. In this example, the overlap between sub1 and pub2 will be computed by a plurality of matching nodes 3, here the matching nodes that handles the tiles t3 and t6, resulting in duplicated messages to the subscriber.

A solution would be to address this issue with an a posteriori agreement, i.e., the front-end module 30 becomes responsible for identifying and eliminating duplicates. However, such a solution would have several disadvantages: First, the detection of duplicates by using a list or a set in an unbounded message stream is not practical due to memory constraints; secondly, when publications and subscriptions overlap with many tiles, the amount of duplicated messages transmitted in the cluster might result in network congestion. A filtering mechanism is required with a match filter service being responsible for eliminating duplicates and transmitting matches to subscribers.

Therefore, and according to an aspect of the invention, an agreement between matching nodes 3 that does not require a centralized coordination is used to avoid those problems. Each matching node 3 knows the topology of each tile 1 and the territory 2 associated with all the subscriptions and publications it manages. It is thus able to infer when a match can be detected in other tiles, and which other matching node will compute the exact same match. Given this fact, a convention is used to determine which matching node 3 is responsible for sending the message of a match to the subscriber.

Let H be a hash function that maps tiles to distinct integers. Given any set of tiles T, we define $H_{min}(T)$ to be the tile with the minimum hash value. On this basis, an a priori min-wise hashing agreement can be expressed with one condition: given any tile overlapped by both pub1 and sub1, a matching node associated with this tile transmits the match to the end user only if the condition tile=$H_{min}$(tiles (pub1.Z∩sub1.Z)) is satisfied, i.e., the tile with the minimum identifier hash value will be selected Other a priori agreements might be used; for example, the matching node 3 associated with the tile 1 having the maximum hash value; or the matching node having the minimum, or maximum identifier; or the matching node having the maximum or minimum IP address or mac address; etc. Any unique information relating to one tile or matching node that is known by other server nodes and that can be used for a comparison can be used for an agreement. Using a convention based on an a priori known information avoids the need for exchanging messages between matching nodes 3, and thus reduces the traffic in the system.

The present method and system might be used for example in location-based applications, to power or improve large scale context-aware applications (car-sharing, transportation, travel, meeting, dating, etc.). Alternatively, the method and system might be used for IoT applications, to let nearby moving objects exchange information. In the video game industry, the method and modules can be used to let millions of users play in the "same" virtual world. In augmented reality applications, the method and system can be used to improve the user experience of augmented reality applications such as Pokemon Go.

A subscriber 5 may be a person using an equipment, or an equipment that can autonomously sends subscription requests. Similarly, a publisher 4 may be a person using an equipment, or an equipment that can autonomously sends publication requests. A single client node may be a subscriber at a given time, and a publisher at a different time or at the same time. Some client nodes may be only subscribers and some other client nodes may be only publishers. For example, a client node might include a sensor for sensing a physical parameter as content, for example a parameter related to the state of an equipment or person.

The client node may further include a transmitting unit, such as without limitation a LoRa transmitting unit, a WiFi transmitter, a Bluetooth transmitter, a Zigbee transmitter, etc.

A matching node 3 and an access node 6 may include various hardware and software components for detecting matches and trigger actions based on detected matches between publications and subscriptions.

The various components of the above described system may communicate with each other over various communications protocols, such as, without restriction, a TCP/IP protocol. This communication may occur over a variety of communication channels, including wireless or wired channels, and unidirectional or bidirectional channels.

The teachings herein may be incorporated into (e.g., implemented within or performed by) a variety of apparatuses or devices. For example, one or more aspects taught herein may be incorporated into a phone (e.g. a cellular phone), a wearable device, an object connected to the Internet, an entertainment device (e.g. a music or video device or a headset), a medical sensing device, a user I/O device (e.g. a watch, a remote control, a light switch, a keyboard, a mouse, etc.), a sensor, or any other suitable device.

The modules and nodes described herein may be implemented in a variety of ways. Referring to FIG. 2, modules 30, 31, 32 are represented as functional blocks that may represent functions implemented by, for example, a software module executed by a microprocessor, or by one or more integrated circuits (e.g. an ASIC, or a FPGA circuit).

As discussed herein, each module and node may include a processor, software, other components, or some combination thereof.

Those of skill in the art would understand that information and messages may be represented using any of a variety of different technologies. For example, messages and information that may be referenced throughout the above description may be represented by voltages, currents, electromagnetic waves, magnetic fields or particles, optical fields or particles, or any combination thereof.

Those of skill would further appreciate that any of the various illustrative logical modules, nodes, means, and method steps described in connection with the aspects disclosed herein may be implemented as electronic hardware, as various forms of program or design code incorporating instructions (which may be referred to herein, for convenience, as "software" or a "software module"), or combinations of both. To clearly illustrate this interchangeability of hardware and software, various illustrative components, nodes, modules, and steps have been described above generally in terms of their functionality. Whether such functionality is implemented as hardware or software depends upon the particular application and design constraints imposed on the overall system.

The various modules, nodes and servers may be implemented by a single processor, equipment, servers or machine, or by a plurality of such devices. For example, each module, node or server may be implemented by one physical computer or server, by one virtual server, or in the cloud.

It is understood that any specific order or hierarchy of steps in any disclosed process is an example of a sample approach. The specific order or hierarchy of steps in the processes may be rearranged.

The steps of a method or algorithm described in connection with the aspects disclosed herein may be embodied directly in hardware, in a software module executed by a processor, or in a combination of the two. A software module (e.g. including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such a processor can read information (e.g., code) from and write information to the storage medium.

Moreover, in some aspects any suitable computer-program product may comprise a computer-readable medium comprising codes (e.g. executable by at least one computer) for performing any of the functions of the above described modules.

REFERENCE NUMBERS

1. Tile
2. Territory
2A. Territory of a publication
2B. Territory of a subscription
3. Matching node
4. Publisher (publishing client node)
5. Subscriber (subscribing client node)
6. Access node
7. Region
30. Front-end module
31. State manager module
32. Tile manager module

The invention claimed is:

1. A method for matching subscriptions of subscribing client nodes with publications of publishing client nodes,
   wherein each subscription is associated with a territory of the subscription and wherein each publication is associated with a territory of the publication;
   wherein a geographical region is divided into a plurality of tiles;
   wherein each tile has an associated matching node for detecting matches between publications and subscriptions in that tile;
   wherein a match is detected when the territory associated with a given subscription and the territory associated with a given publication overlaps in that tile;
   wherein the matching node is arranged to trigger an action of notifying the subscribing client node when such a match has been detected;
   wherein each matching node is further arranged to detect when a match between a particular publication and a particular subscription will be detected in more than one tile;
   and wherein said matching node uses an a priori agreement for determining whether it triggers said action or whether another matching node will do it when a match between a particular publication and a particular subscription will also be detected by the other matching node.

2. The method of claim 1, wherein the association between each tile and the matching node responsible for detecting matches within that tile is determined with consistent hashing or rendezvous hashing (HRW) of the tile identifiers.

3. The method of claim 1, wherein said agreement depends on a unique identifier of the tile or of the matching node associated with the tile.

4. The method of claim 3, wherein said agreement depends on a hash of said unique identifier of the tile or matching node.

5. The method of claim 4, wherein said event is triggered by the tile or matching node having the lowest said hash among all the tiles, respectively matching nodes, that detect said match.

6. The method of claim 1, wherein at least one state manager module determines which tile overlaps with the territory of a new or updated publication or subscription.

7. The method of claim 1, wherein at least one front-end module receives requests from said client nodes to add, update or remove publications or subscriptions.

8. The method of claim 7, wherein a plurality of front-end modules is used.

9. The method of claim 7, wherein each said front-end module forwards said requests to a state manager module.

10. The method of claim 9, wherein said front-end module uses consistent hashing or rendezvous hashing to determine which among a plurality of state manager modules will handle said requests.

11. The method of claim 1, said client nodes being IoT enabled devices.

12. A matching node arranged for matching subscriptions of subscribing client nodes with publications of publishing client nodes,
   wherein each subscription is associated with a territory of the subscription and wherein each publication is associated with a territory of the publication;
   wherein a geographical region is divided into a plurality of tiles;
   wherein said matching node is associated with one of said tile in order to detect matches between publications and subscriptions in that tile;
   wherein said matching node is arranged for detecting when the territory associated with a given subscription and the territory associated with a given publication overlap in that tile;
   wherein the matching node is arranged to trigger an action of notifying the subscribing client node when such a match has been detected;
   wherein the matching node is arranged for detecting when a match between a particular publication and a particular subscription will be detected by another matching node;
   and wherein said matching node uses an a priori agreement for determining whether it triggers said action or whether another matching node will do it when a match between a particular publication and a particular subscription will also be detected by the other matching node.

13. The matching node of claim 12, wherein said agreement is based on a comparison between the identifiers of each matching node.

14. The matching node of claim 12, wherein said agreement is based on a comparison between the hash of the identifiers of each matching node.

15. The matching node of claim 12, wherein each matching node detects matches in one or a plurality of tiles, and wherein said agreement is based on a comparison between the identifiers of each of said tiles.

16. The matching node of claim 12, wherein each matching node detects matches in one or a plurality of tiles, and wherein said agreement is based on a comparison between the hash of the identifiers of each of said tiles.

17. A system comprising:
   a plurality of client nodes arranged for sending geo-localised publications and/or geo-localised subscriptions;
   a plurality of matching nodes arranged for detecting matches between subscriptions and publications, wherein each of said matching nodes is arranged to detect matches in a limited number of tiles among a larger number of tiles;
   wherein each subscription is associated with a territory of the subscription and wherein each publication is associated with a territory of the publication;
   wherein a geographical region is divided into a plurality of tiles;
   wherein each tile has an associated matching node for detecting matches between publications and subscriptions in that tile;
   wherein each said matching node is arranged for detecting when the territory associated with a given subscription and the territory associated with a given publication overlaps in that tile, wherein each of said matching nodes is arranged to detect matches in a limited number of tiles among a larger number of tiles;
   wherein the matching node is arranged to trigger an action of notifying the subscribing client node when such a match has been detected;
   wherein each matching node is further arranged to detect when a match between a particular publication and a particular subscription will be detected by more than one matching node;
   and wherein said matching node uses an a priori agreement for determining whether it triggers said action or whether another matching node will do it when a match between a particular publication and a particular subscription will also be detected by the other matching node.

* * * * *